(12) United States Patent
Yun (10) Patent No.: US 12,196,023 B2
(45) Date of Patent: Jan. 14, 2025

(54) DOOR HINGE DEVICE FOR VEHICLE

(71) Applicants: HYUNDAI MOTOR COMPANY, Seoul (KR); Kia Corporation, Seoul (KR)

(72) Inventor: Hyungin Yun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 334 days.

(21) Appl. No.: 17/956,998

(22) Filed: Sep. 30, 2022

(65) Prior Publication Data

US 2023/0203862 A1 Jun. 29, 2023

(30) Foreign Application Priority Data

Dec. 29, 2021 (KR) ........................ 10-2021-0191404

(51) Int. Cl.
*E05D 3/02* (2006.01)
*B60J 5/04* (2006.01)
*E05D 15/58* (2006.01)
*E05D 3/12* (2006.01)

(52) U.S. Cl.
CPC ............ *E05D 3/022* (2013.01); *B60J 5/0479* (2013.01); *E05D 15/58* (2013.01); *B60J 2005/0475* (2013.01); *E05D 3/122* (2013.01); *E05Y 2900/531* (2013.01)

(58) Field of Classification Search
CPC ......... E05D 3/127; E05D 3/147; E05D 15/58; E05D 3/022; B60J 5/0479; B60J 2005/0475

USPC ............................................ 296/146.11, 155
See application file for complete search history.

(56) References Cited

U.S. PATENT DOCUMENTS

| 6,997,504 | B1 * | 2/2006 | Lang | E05D 3/127 |
| | | | | 296/146.12 |
| 10,787,845 | B2 * | 9/2020 | Trentin | E05D 3/127 |
| 10,876,341 | B2 * | 12/2020 | Taylor | E05F 15/41 |
| 12,110,721 | B2 * | 10/2024 | Yun | E05D 15/58 |
| 2008/0083090 | A1 * | 4/2008 | Hoffman | E05D 3/10 |
| | | | | 16/367 |
| 2016/0129769 | A1 * | 5/2016 | Choi | E05B 85/24 |
| | | | | 49/159 |
| 2022/0389744 | A1 * | 12/2022 | Lee | E05D 3/127 |
| 2022/0412137 | A1 * | 12/2022 | Lee | B60J 5/0479 |
| 2022/0412142 | A1 * | 12/2022 | Lee | E05D 15/58 |
| 2023/0202270 | A1 * | 6/2023 | Yim | E05F 1/12 |
| | | | | 296/146.11 |

(Continued)

FOREIGN PATENT DOCUMENTS

CN 118107354 A * 5/2024
KR 10-2019-0028966 A 3/2019

*Primary Examiner* — Jason S Morrow
(74) *Attorney, Agent, or Firm* — MORGAN, LEWIS & BOCKIUS LLP (57) ABSTRACT

A door hinge device for a vehicle is capable of facilitating two doors to be simultaneously or independently opened or closed in a state in which rotation trajectories of the doors are ensured as a hinge bar connected to a carrier of a speed reduction unit through a hinge shaft and a rack and a pinion connected to a rotation shaft of a sun gear set a rotation amount of the doors during a process in which a hinge unit of the door moves along a rail in a diagonal direction toward the outside of a vehicle body in a vehicle including no B pillar.

14 Claims, 10 Drawing Sheets

(56) References Cited

U.S. PATENT DOCUMENTS

| | | | |
|---|---|---|---|
| 2023/0202271 A1* | 6/2023 | Yim | B60J 5/0479 16/246 |
| 2023/0203867 A1* | 6/2023 | Yun | E05D 15/58 296/146.1 |
| 2023/0220719 A1* | 7/2023 | Yim | E05D 15/58 49/70 |
| 2024/0247532 A1* | 7/2024 | Lee | B60J 5/048 |
| 2024/0300306 A1* | 9/2024 | Kim | B60J 5/0479 |

* cited by examiner

DOOR HINGE DEVICE FOR VEHICLE

CROSS-REFERENCE TO RELATED APPLICATION

The present application claims priority to Korean Patent Application No. 10-2021-0191404 filed on Dec. 29, 2021, the entire contents of which is incorporated herein for all purposes by this reference.

BACKGROUND OF THE PRESENT DISCLOSURE

Field of the Present Disclosure

The present disclosure relates to a door hinge device for a vehicle, and more particularly, to a door hinge device for a vehicle, which is capable of independently opening or closing a door by ensuring a rotation trajectory by pushing a hinge unit of the door toward the outside of a vehicle body in a vehicle having no B pillar.

Description of Related Art

In general, a door of a vehicle separates the inside and outside of the vehicle and performs important functions of blocking external noise, rainwater, dust, wind, and the like and safely protecting an occupant by absorbing impact together with a side structure in the event of a broadside collision.

There are various types of doors for a vehicle including doors for special purposes. However, hinge type swing doors are widely used for passenger vehicles.

Typically, the swing door refers to a door which is opened toward the outside of a vehicle body about a hinge shaft provided by a hinge bracket disposed between the swing door and the vehicle body. The advantage of the swing door is that the swing door is easily opened or closed and has a simple structure, which makes it easy to maintain and repair the swing door.

Meanwhile, opposite swing doors are applied to some vehicles. The opposite swing doors provide wide openness when opened and make it easy for the occupant to get in or out of the vehicle.

The opposite swing doors are classified into a type having no B pillar and a type having the B pillar.

Figure 1:
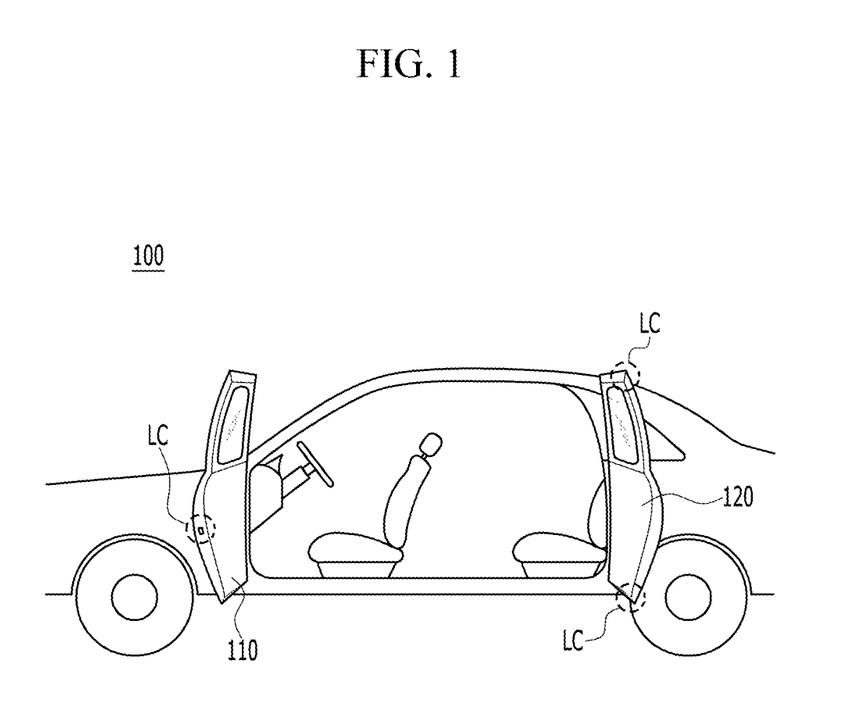
FIG. 1 is a side view exemplarily illustrating a vehicle to which opposite swing doors according to an example of the related art are applied.
Figure 2:
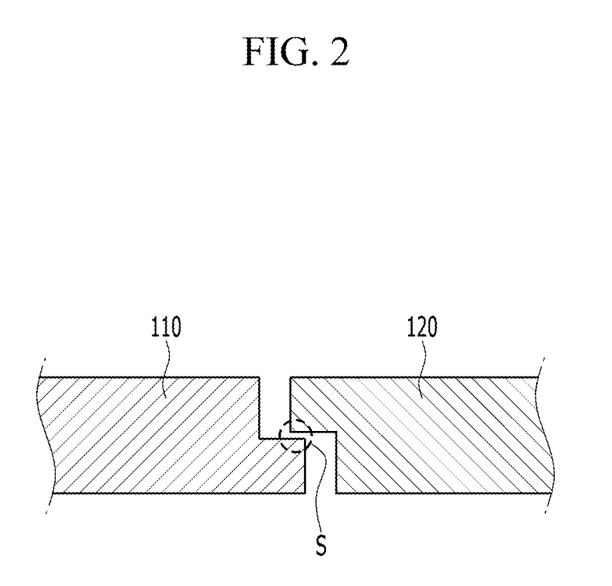
FIG. 2 is a cross-sectional view exemplarily illustrating a portion where a front door and a rear door of the vehicle in FIG. 1 adjoin each other.

FIG. 1 is a side view exemplarily illustrating a vehicle to which opposite swing doors an example of the related art are applied, and FIG. 2 is a cross-sectional view exemplarily illustrating portions of front and rear doors of the vehicle in FIG. 1 that adjoin each other.

First, FIG. 1 and FIG. 2 illustrate an example of the opposite swing doors applied to a vehicle 100 having no B pillar. A hinge unit of a front door 110 is provided at a front end portion of the front door 110, and a hinge unit of a rear door 120 is provided at a rear end portion of the rear door 120.

In the case of the opposite swing doors, a latch unit LC for maintaining a locking state is provided at one side of the front door 110 or the rear door 120.

Furthermore, a sealing portion S for sealing is provided between a rear end portion of the front door 110 and a front end portion of the rear door 120.

As described above, the opposite swing doors of the vehicle 100 having no B pillar have good openness for allowing the occupant to easily get in or out of the vehicle or perform leisure activities. However, the opposite swing doors of the vehicle 100 have a problem in that the sequence of opening or closing the front and rear doors 110 and 120, such as the sequence of opening the front door 110 first or closing the front door 110 later, is set in advance because of interference that occurs as a rotation trajectory of the front door 110 and a rotation trajectory of the rear door 120 overlap each other when the front door 110 and the rear door 120 are opened or closed.

Because the sequence of opening or closing the front and rear doors 110 and 120 is set in advance as described above, it is impossible to open or close only the rear door 120.

Figure 3:
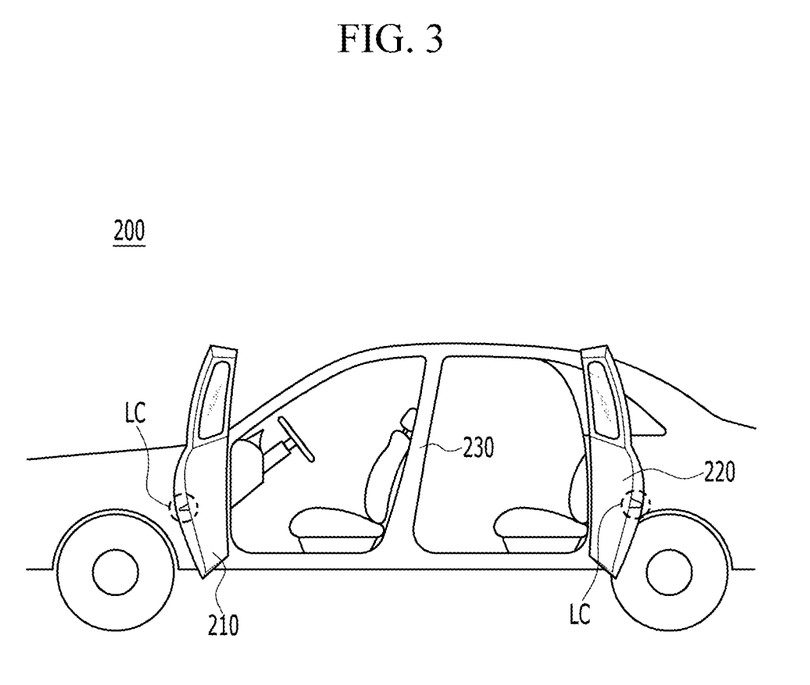
FIG. 3 is a side view exemplarily illustrating a vehicle to which opposite swing doors according to another example of the related art are applied.
Figure 4:
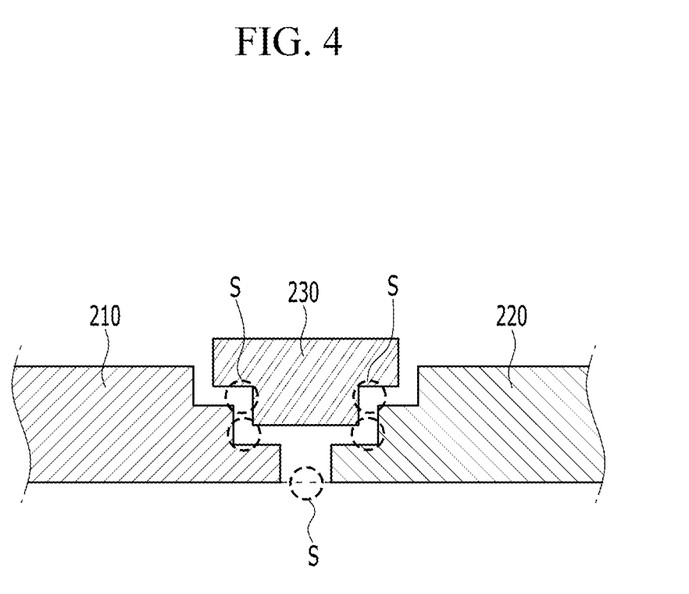
FIG. 4 is a cross-sectional view exemplarily illustrating a part where a front door and a rear door of the vehicle in FIG. 3 adjoin each other.

FIG. 3 is a side view exemplarily illustrating a vehicle to which opposite swing doors according to another example of the related art are applied, and FIG. 4 is a cross-sectional view exemplarily illustrating portions of front and rear doors of the vehicle in FIG. 3 that adjoin each other.

FIG. 3 and FIG. 4 illustrate an example of the opposite swing doors applied to a vehicle 200 having B pillars 230. Furthermore, a hinge unit of a front door 210 is provided at a front end portion of the front door 210, and a hinge unit of a rear door 220 is provided at a rear end portion of the rear door 220.

In the case of the opposite swing doors, latch units LC for maintaining locking states are provided between the B pillar 230 and one side of the front door 210 and one side of the rear door 220.

Furthermore, sealing portions S for sealing are provided between the B pillar 230, a rear end portion of the front door 210 facing the B pillar 230, and a front end portion of the rear door 220 facing the B pillar 230.

In the case of the opposite swing doors of the vehicle 100 having the B pillars described above, the front and rear doors 210 and 220 are configured to rotate relative to the B pillar 230. Therefore, the front and rear doors 210 and 220 may be independently opened or closed, and the operational sequence may be freely set. However, there is a problem in that the B pillar 230 degrades openness when the occupant gets in or out of the vehicle or performs leisure activities.

As described above, the opposite swing doors differ in openness from one another depending on the presence or absence of the B pillar and have differences in operations of opening or closing the front and rear doors.

Meanwhile, to solve the above-mentioned problem with the operational sequences of the front and rear doors 110 and 120 while maintaining the openness of the vehicle 100 having no B pillar, there is an example in the related art in which a gooseneck type hinge device is applied as a door hinge device for the opposite swing doors. However, because of the shape characteristics of the gooseneck type hinge device, the gooseneck type hinge device requires a large available space in a width direction of the vehicle body, which makes it difficult to configure a layout of the vehicle body.

Therefore, there is a demand for a door hinge device for implementing a new opening/closing structure to apply the opposite swing doors to the vehicle having no B pillar.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door hinge device for a vehicle, which is configured for facilitating doors to be independently opened or closed in a state in which rotation trajectories of the doors are ensured as a hinge bar connected to a carrier of a speed reduction unit through a hinge shaft and a rack and a pinion connected to a rotation shaft of a sun gear set a rotation amount of the doors during a process in which a hinge unit of the door moves along a rail in a diagonal direction toward the outside of a vehicle body in a vehicle including no B pillar.

Various aspects of the present disclosure are directed to providing a door hinge device for a vehicle, the door hinge device including: a rail bracket provided at one side of a vehicle body corresponding to one end portion of a door and including a rail formed to be directed toward the outside of the vehicle body; a roller block configured to support rotation of upper and lower rollers rollably supported on upper and lower rails on the rail bracket; a speed reduction unit including, in the casing, a sun gear, a plurality of planet gears, a ring gear, and a carrier configured to rotatably support the plurality of planet gears, the speed reduction unit being fixed to the roller block through the casing; a hinge shaft connected to a rotation center of the carrier and including an upper end portion connected to the one end portion of the door by an upper hinge bar outside the casing; a rotation shaft connected to a rotation center of the sun gear and including a lower end portion connected to the one end portion of the door by a lower hinge bar outside the casing; a rack fixed to a lower portion the rail bracket and disposed in a longitudinal direction thereof; and a pinion fixedly connected to one side of a lower portion of the rotation shaft outside the casing and configured to engage with the rack.

The one end portion of the door may be a front end portion of a front door or a rear end portion of a rear door.

The rail bracket may be provided in a diagonal direction toward a front external side of the vehicle body or a rear external side of the vehicle body.

The roller block may be configured so that an upper roller is rollably supported on the upper rail, and a lower roller is rollably supported on the lower rail.

The upper roller and the lower roller may each be configured as a circular roller bearing.

Rolling support surfaces of the upper roller and the lower roller and rolling support surfaces of the upper and lower rails, on which the upper roller and the lower roller are rollably supported, may each be a semi-circular contact surface.

The speed reduction unit may include: the casing fixed to an external surface of the roller block; a sun gear disposed at a center portion in the casing and including a lower end portion fixedly connected to a rotation center of the pinion outside the casing; three planet gears radially disposed at an equal interval and configured to externally engage with an external periphery of the sun gear; a ring gear configured as a circular internal gear in the casing and configured to internally engage with the three planet gears; and a carrier including a rotation center fixedly connected to the hinge shaft and configured to rotatably support the three planet gears so that the three planet gears rotate about centers of the three planet gears and revolve around the sun gear.

A reduction ratio between the hinge shaft and the rotation shaft connected to the speed reduction unit may be set so that a swing operation of the door is completed in proportion to a length of the rail bracket.

The hinge shaft may be fixedly connected to a rotation center of the carrier in the casing, and an upper end portion of the hinge shaft may penetrate the casing of the speed reduction unit and be fixed to the upper hinge bar.

The upper hinge bar may have a 'U' shape, one end portion of the upper hinge bar may be fixed to an upper end portion of the hinge shaft, and the other end portion of the upper hinge bar may be fixedly connected to one end portion of the door.

Furthermore, the lower hinge bar may have a 'U' shape, one end portion of the lower hinge bar may be rotatably connected to a lower end portion of the rotation shaft, and the other end portion of the lower hinge bar may be fixedly connected to one end portion of the door.

A rotation of the hinge shaft and a rotation of the rotation shaft may be supported by bearings in the casing.

According to the exemplary embodiment of the present disclosure, it is possible to simultaneously open or close the doors or independently open or close only one door in the state in which the rotation trajectories of the doors are ensured as the hinge bar connected to the carrier of the speed reduction unit through the hinge shaft and the rack and the pinion connected to the rotation shaft of the sun gear set the rotation amount of the doors during the process in which the hinge unit of the door moves along the rail in the diagonal direction toward the outside of the vehicle body in the vehicle including no B pillar.

That is, when the door moves in the diagonal direction toward the outside of the vehicle body, the rotation amount of the door may be restricted by the rack, the pinion, and the speed reduction unit of the planetary gear set type, preventing interference between the doors.

Therefore, the exemplary embodiment of various aspects of the present disclosure are directed to providing good openness when the occupant gets in or out of the vehicle or performs leisure activities in the case of the opposite swing doors of the vehicle including no B pillar so that the sequence of opening or closing the door does not affect the process of opening or closing the door.

Furthermore, the exemplary embodiment of various aspects of the present disclosure are directed to providing advantages in that the door hinge device is slimmer than a gooseneck type hinge device in the related art and does not require an available space for ensuring an operation radius, providing an available space for configuring a layout of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings.

Furthermore, the size and thickness of each component illustrated in the drawings are arbitrarily shown for ease of description, but the present disclosure is not limited thereto. To clearly describe several portions and regions, thicknesses thereof are enlarged or reduced. Furthermore, a part irrelevant to the description will be omitted to clearly describe the exemplary embodiment of the present disclosure.

Figure 5:
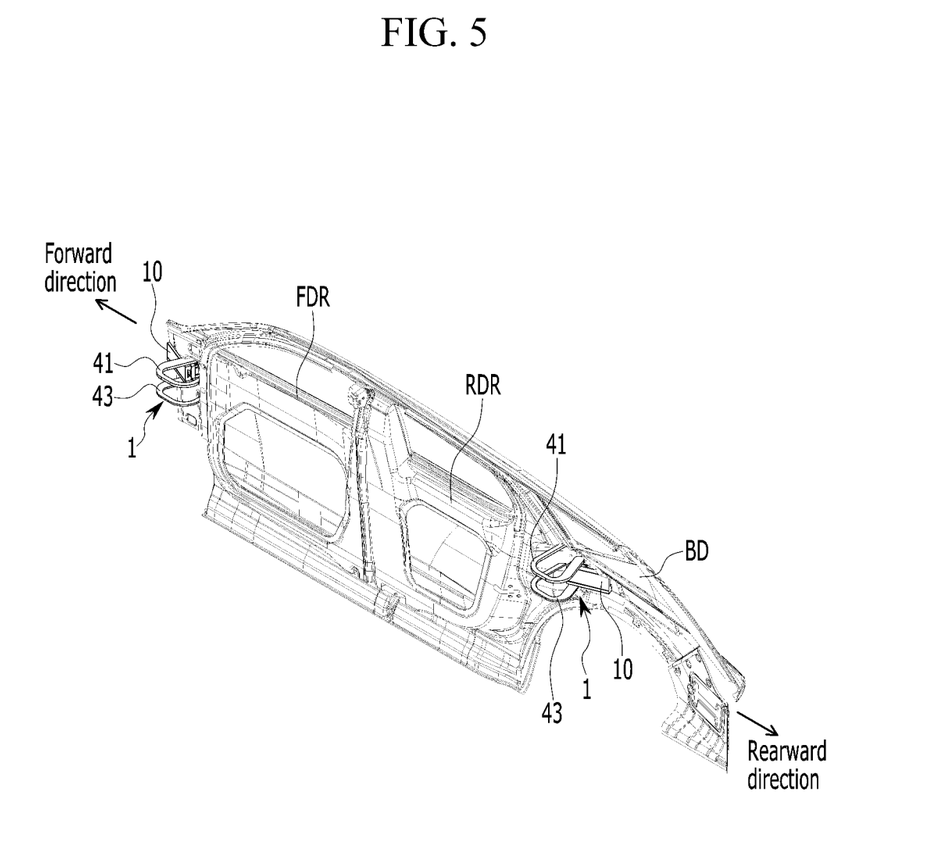
FIG. 5 is a perspective view exemplarily illustrating an internal side of a door of a vehicle to which a door hinge device for a vehicle according to various exemplary embodiments of the present disclosure is applied.

In the description of the exemplary embodiment of the present disclosure, for the convenience of description, a leftward or upward direction is defined as a forward direction, and a rightward or downward direction is defined as a rearward direction, based on FIG. 5. Furthermore, a door hinge device for a vehicle according to various exemplary embodiments of the present disclosure may be provided on two front doors and two rear doors disposed at front and rear sides of a driver seat and a passenger seat of a vehicle. In the exemplary embodiment of the present disclosure, an example will be described in which the door hinge devices are applied to the front and rear doors at the front and rear sides of the passenger seat.

Figure 6:
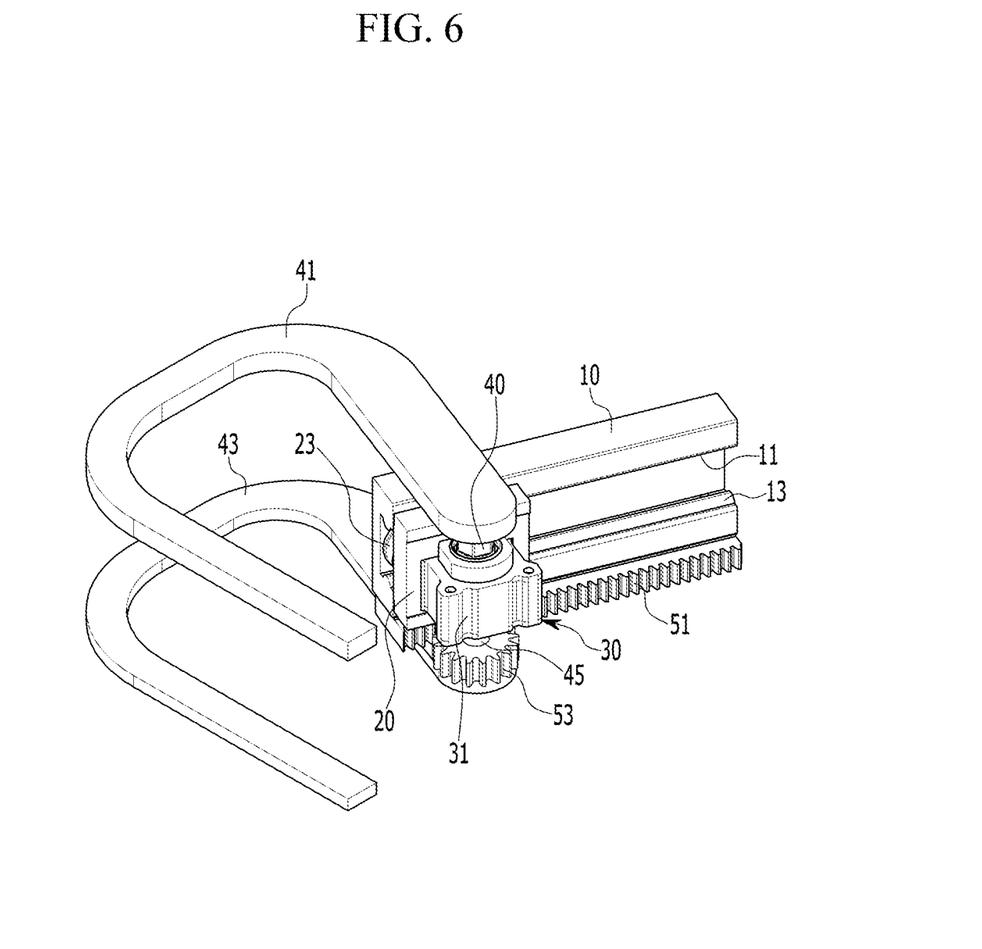
FIG. 6 is a perspective view of the door hinge device for a vehicle according to the exemplary embodiment of the present disclosure.
Figure 7:
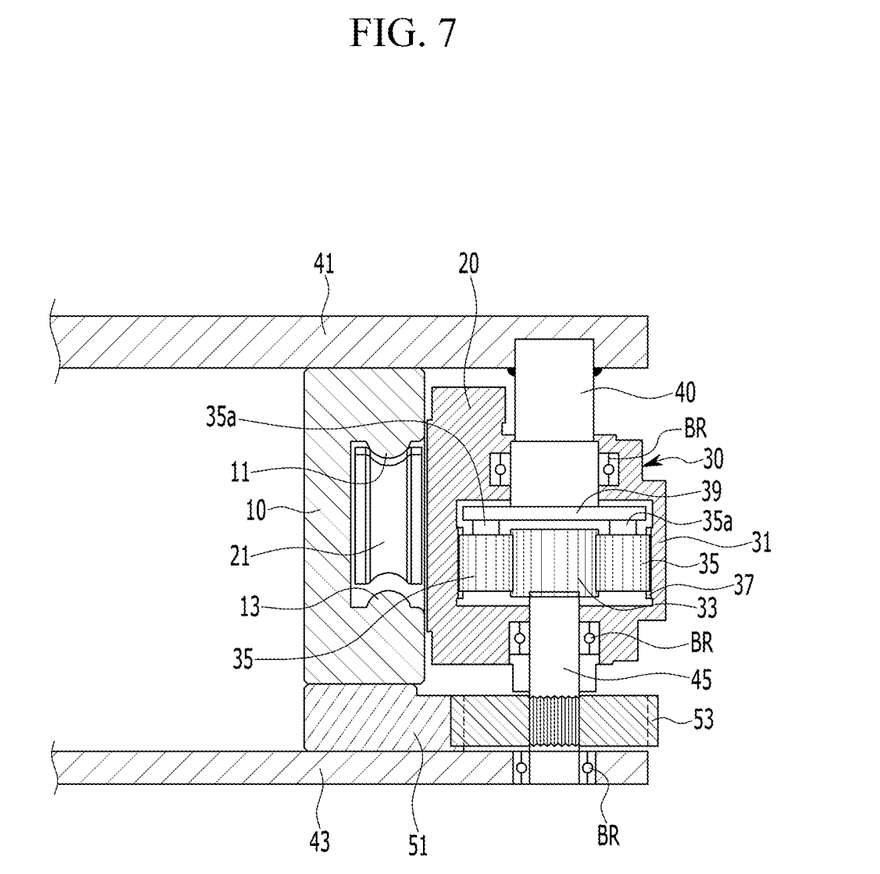
FIG. 7 is a cross-sectional side view of a speed reduction unit applied to the door hinge device for a vehicle according to the exemplary embodiment of the present disclosure.
Figure 8:
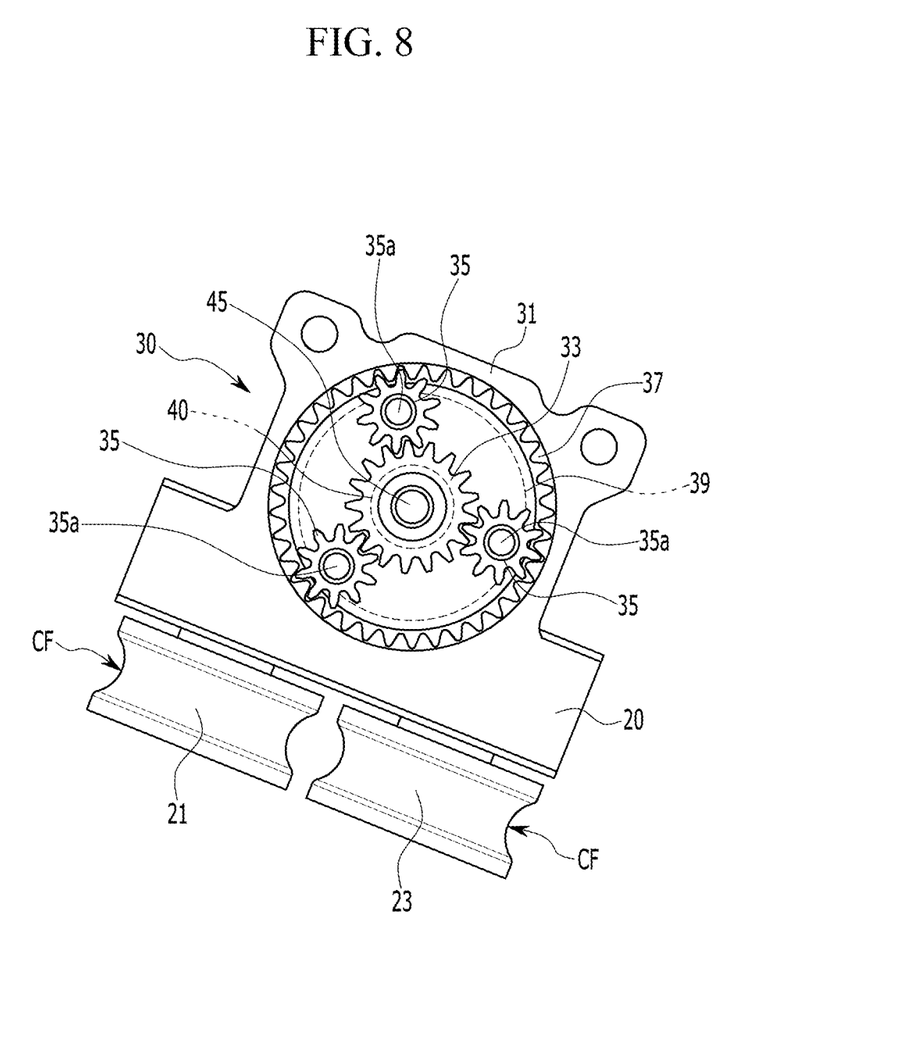
FIG. 8 is a top plan cross-sectional view of the speed reduction unit applied to the door hinge device for a vehicle according to the exemplary embodiment of the present disclosure.

FIG. 5 is a perspective view exemplarily illustrating an internal side of a door of a vehicle to which a door hinge device for a vehicle according to various exemplary embodiments of the present disclosure is applied, FIG. 6 is a perspective view of the door hinge device for a vehicle according to the exemplary embodiment of the present disclosure, FIG. 7 is a cross-sectional side view of a speed reduction unit applied to the door hinge device for a vehicle according to the exemplary embodiment of the present disclosure, and FIG. 8 is a top plan cross-sectional view of the speed reduction unit applied to the door hinge device for a vehicle according to the exemplary embodiment of the present disclosure.

A door hinge device 1 for a vehicle according to various exemplary embodiments of the present disclosure may be applied to portions between two front doors FDR and a vehicle body BD and portions between two rear doors RDR and the vehicle body BD of a passenger vehicle including no B pillar.

That is, during a process of opening or closing the door, the front door FDR or the rear door RDR moves toward the outside of the vehicle body BD in a diagonal direction from a front side of the vehicle body BD or a rear side of the vehicle body BD so that rotation trajectories of the doors are ensured. In the instant state, the two doors may be simultaneously opened or closed or only one door may be opened or closed.

Hereinafter, the door may simultaneously indicate the front door FDR or the rear door RDR, but the front door FDR and the rear door RDR are not distinguished in the detailed description of the configuration of the door hinge device 1.

Referring to FIGS. 5 to 8, the door hinge device 1 for a vehicle according to the exemplary embodiment of the present disclosure may include a rail bracket 10, a roller block 20, a speed reduction unit 30, a hinge shaft 40, a rotation shaft 45, a rack 51, and a pinion 53.

The rail bracket 10 is provided at one side of the vehicle body BD facing one end portion of the door. An upper rail 11 and a lower rail 13 are, respectively, disposed on upper and lower portions of the rail bracket 10 and directed toward the outside of the vehicle body BD.

In the instant case, one end portion of the door may be a front end portion of the front door FDR or a rear end portion of the rear door RDR.

The rail bracket 10 may be provided in a diagonal direction toward the front outside of the vehicle body BD or the rear outside of the vehicle body BD.

The roller block 20 is provided in a form of a block for supporting rotations of upper and lower rollers 21 and 23 respectively rollably supported on the upper and lower rails 11 and 13 on the rail bracket 10.

In the instant case, the upper roller 21 is in contact with and rollably supported on the upper rail 11, and the lower roller 23 is in contact with and rollably supported on the lower rail 13.

Furthermore, the upper roller and the lower roller 21 and 23 may each be configured as a circular roller bearing.

Furthermore, rolling support surfaces of the upper roller and the lower roller 21 and 23 and rolling support surfaces of the upper and lower rails 11 and 13, on which the upper roller and the lower roller 21 and 23 are rollably supported, may each be a semi-circular contact surface CF.

The speed reduction unit 30 is fixed to the roller block 20 by a casing 31. The speed reduction unit 30 includes, in the casing 31, a sun gear 33, three planet gears 35, a ring gear 37, and a carrier 39 configured to rotatably support the three planet gears 35.

That is, referring to FIGS. 7 and 8, the quadrangular casing 31 of the speed reduction unit 30 is fixed to an external surface of the roller block 20. As rotation elements, the sun gear 33, the three planet gears 35, the ring gear 39, and the carrier 39 are provided in the casing 31.

The sun gear 33 is disposed at a center portion in the casing 31, and the rotation shaft 45 extending downward is fixedly coupled to a rotation center of the sun gear 33.

Furthermore, the three planet gears 35 are radially disposed at an equal interval and externally engage with an external periphery of the sun gear 33.

In the instant case, the three planet gears 35 are connected to the carrier 39 by center shafts 35a and configured to be rotatably supported to revolve around the rotation center of the sun gear 33 and rotate about the center shafts 35a.

The ring gear 37 is provided in a form of a circular internal gear formed along an internal peripheral surface in the casing 31. The ring gear 37 internally engages with the three planet gears 35.

Furthermore, the three planet gears 35 are connected to the carrier 39 by the center shafts 35a and configured to be rotatably supported to perform the revolution and the rotation. The rotation center extending upward is fixedly connected to the hinge shaft 40.

That is, the speed reduction unit 30 is configured as a single-pinion planetary gear set in the casing 31. The rotation shaft 45 extending downward is fixedly connected to the rotation center of the sun gear 33 and rotates integrally with the sun gear 33. The hinge shaft 40 extending upward is fixedly connected to the rotation center of the carrier 39 and rotates integrally with the carrier 39.

In the instant case, a reduction ratio of the planetary gear set of the speed reduction unit 30 may be set within a range in which a swing operation of the door may be completed in proportion to lengths of the upper and lower rails 11 and 13 of the rail bracket 10.

Furthermore, in a state in which the hinge shaft 40 is fixedly connected to the rotation center of the carrier 39 in the casing 31, the hinge shaft 40 is coupled to an upper hinge bar 41 including an upper end portion which is provided to penetrate the casing 31 and is connected to one end portion of the door at the upper side of the casing 31. That is, the upper hinge bar 41 swings the door as the hinge shaft 40 rotates.

One side of the hinge shaft 40 is rotatably supported by a bearing BR in the casing 31.

Furthermore, in a state in which the rotation shaft 45 is fixedly connected to the rotation center of the sun gear 33 in the casing 31, the rotation shaft 45 is connected, by the bearing BR, to the lower hinge bar 43 including a lower end portion which is provided to penetrate the casing and is connected to one end portion of the door at the lower side of the casing 31.

In the instant case, the rotation shaft 45 operates regardless of a rotation of the lower hinge bar 43. One side of the rotation shaft 45 is rotatably supported by the bearing BR in the casing 31.

In the instant case, the hinge shaft 40 and the rotation shaft 45 are connected to the speed reduction unit 30 and rotated at a preset reduction ratio relative to each other. The reduction ratio may be set so that the swing operation of the door is completed in proportion to a length of the rail bracket 10.

Furthermore, the upper hinge bar 41 has a 'U' shape. One end portion of the upper hinge bar 41 is fixedly connected to the upper end portion of the hinge shaft 40, and the other end portion of the upper hinge bar 41 is fixedly connected to one end portion of the door.

Furthermore, the lower hinge bar 43 has a 'U' shape, like the upper hinge bar 41. One end portion of the lower hinge bar 43 is connected to the lower end portion of the rotation shaft 45 with the bearing BR interposed therebetween, and the other end portion of the lower hinge bar 43 is fixedly connected to one end portion of the door.

In the instant case, when the door is the front door FDR, the other end portion of each of the upper and lower hinge bars 41 and 43 may be fixedly connected to one side of the front end portion of the front door FDR. When the door is the rear door RDR, the other end portion of each of the upper and lower hinge bars 41 and 43 may be fixedly connected to one side of the rear end portion of the rear door RDR.

Furthermore, one end portion of the upper hinge bar 41 is fixedly connected to the hinge shaft 40, but one end portion of the lower hinge bar 43 is connected to the lower end portion of the rotation shaft 45 by the bearing BR so that one end portion of the lower hinge bar 43 cannot receive a rotation force of the hinge shaft 40. Therefore, the lower hinge bar 43 is a structure including the other end portion connected to one end portion of the door and configured to simply rotate together with the door.

Furthermore, the rack 51 has a rack bar shape. The rack 51 is fixed on the lower portion of the rail bracket 10 and disposed in the longitudinal direction thereof.

Furthermore, the pinion 53 is fixed to one side of a lower portion of the rotation shaft 45 and engages with the rack 51. That is, the pinion 53 may be fastened to the rotation shaft 45 by a spline structure. The pinion 53 moves along the rack 51 while rotating integrally with the rotation shaft 45, moving the hinge unit of the door in the diagonal direction toward the outside of the vehicle body BD.

Hereinafter, a specific operation of the door hinge device for a vehicle according to the exemplary embodiment of the present disclosure will be described with reference to FIG. 9 and FIG. 10.

Figure 9:
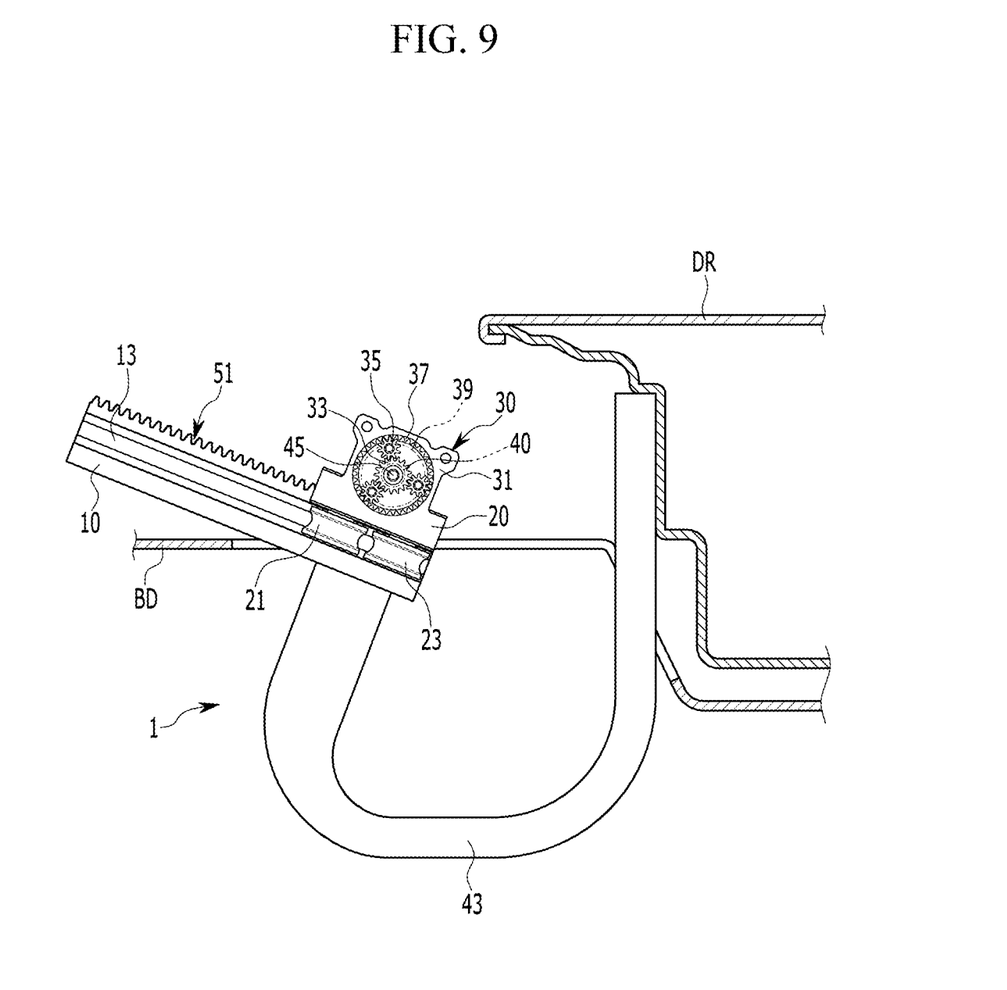
FIG. 9 and FIG. 10 are top plan cross-sectional views exemplarily illustrating states before and after an operation of the door hinge device for a vehicle according to the exemplary embodiment of the present disclosure.
Figure 10:
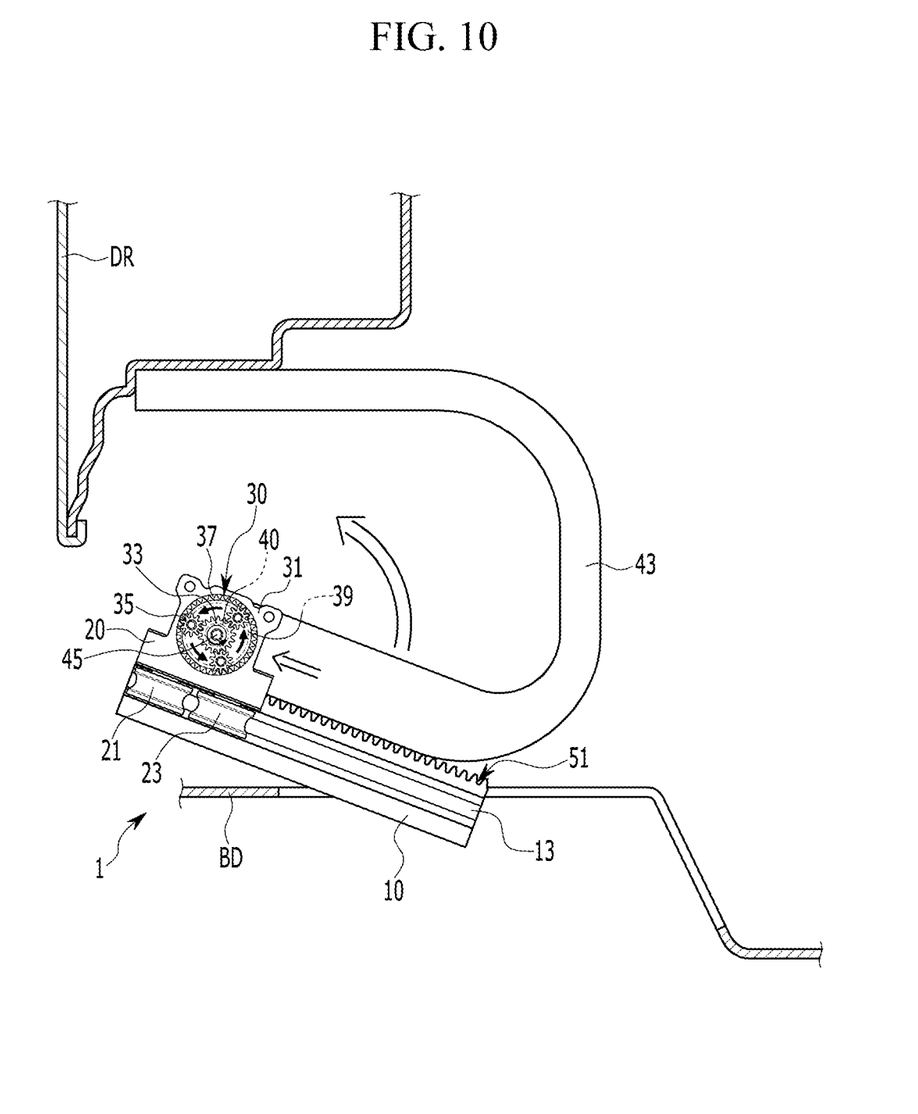

FIG. 9 and FIG. 10 are top plan cross-sectional views exemplarily illustrating states before and after an operation of the door hinge device for a vehicle according to the exemplary embodiment of the present disclosure.

First, FIG. 9 illustrates a state in which the door DR is closed.

In the instant case, the hinge shaft 40 is moved in the diagonal direction toward the interior of the vehicle body 3 together with the speed reduction unit 30, and one end portion of the door DR maintains a closed state of the door DR.

Referring to FIG. 10, as the door DR is opened, the hinge shaft 40 connected to the door DR by the upper hinge bar 41 rotates together in a direction in which the door DR is opened.

Accordingly, as the carrier 39 fixedly connected to the hinge bar 40 rotates, the three planet gears 35 rotate about their centers and revolve along the external periphery of the sun gear 33.

That is, the rotation force, which is generated when the door DR is opened, is transmitted in the same direction to the carrier 39 through the hinge shaft 40. The rotation of the carrier 39 allows the three planet gears 35 to rotate about their centers while moving along the internal periphery of the ring gear 37 fixed in the rotation direction thereof.

In the instant case, as the three planet gears 35 rotates about their centers while revolving around the sun gear 33, the sun gear 33 rotates while increasing a speed thereof and rotates in a direction identical to the revolution direction of the planet gears 35.

Accordingly, the door DR is opened while swinging, and the rotation shaft 45 fixedly connected to the sun gear 33 rotates the pinion 53 engaging with the rack 51. Therefore, the roller block 20, together with the speed reduction unit 30, moves in the diagonal direction toward the outside of the vehicle body along the upper and lower rails 11 and 13 of the rail bracket 10.

Therefore, the door DR is opened as the hinge unit including the hinge shaft 40 ensures the rotation trajectory while moving in the diagonal direction toward the outside of the vehicle body 3.

Therefore, the door hinge device 1 for a vehicle according to the exemplary embodiment of the present disclosure is applied between the vehicle body 3 and one end portion of the door DR in the case of the opposite swing doors of the vehicle including no B pillar. Therefore, the two opposite doors DR may be simultaneously opened or closed or only one door may be opened or closed.

Furthermore, according to the door hinge device 1 for a vehicle according to the exemplary embodiment of the present disclosure, the rack 51, the pinion 53, and the speed reduction unit 30 of a planetary gear set type restrict the rotation amount of the door DR according to the movement amount of the door DR in the diagonal direction toward the outside of the vehicle body, preventing interference between the doors.

That is, for example, when the front door FDR is opened, a rotation speed of the rotation shaft 45 becomes higher than a rotation speed of the hinge shaft 40, and the rotation force is transmitted to the pinion 53.

In the instant case, the rotation of the pinion 53 moves the hinge shaft 40 toward the external front side of the vehicle body along the rack 51 and the upper and lower rails 11 and 13. A desired rotation amount of the front door FDR is adjusted in accordance with the position of the hinge shaft 40.

Furthermore, the door hinge device 1 for a vehicle according to the exemplary embodiment of the present disclosure may overcome the structural limitation of the system in the related art and have the simple structure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for a vehicle, the door hinge apparatus comprising:
   a rail bracket provided at one side of a vehicle body corresponding to one end portion of a door and including a rail formed to be directed toward the outside of the vehicle body;
   a roller block configured to support a rotation of a roller rollably supported on the rail on the rail bracket;
   a hinge shaft including an upper end portion connected to the one end portion of the door by an upper hinge bar;
   a rotation shaft including a lower end portion connected to the one end portion of the door by a lower hinge bar;
   a speed reduction unit fixed to the roller block by a casing and connected to the hinge shaft and the rotation shaft by a plurality of rotation elements provided therein so that the hinge shaft and the rotation shaft rotate at a reduction ratio;
   a rack fixed to the rail bracket; and
   a pinion engaged to the rack.

2. The door hinge apparatus of claim 1, wherein the one end portion of the door is a front end portion of a front door or a rear end portion of a rear door.

3. The door hinge apparatus of claim 1,
   wherein the rail bracket is provided in a diagonal direction toward a front external side of the vehicle body or a rear external side of the vehicle body.

4. The door hinge apparatus of claim 1,
   wherein the rail includes an upper rail and a lower rail, and
   wherein the upper rail and the lower rail are formed on upper and lower portions of the rail bracket and disposed in a longitudinal direction thereof.

5. The door hinge apparatus of claim 4,
   wherein the roller includes an upper roller and a lower roller, and
   wherein the roller block supports rotations of the upper roller and the lower roller so that the upper roller is rollably supported on the upper rail, and the lower roller is rollably supported on the lower rail.

6. The door hinge apparatus of claim 5, wherein the upper roller and the lower roller are each configured as a circular roller bearing.

7. The door hinge apparatus of claim 5, wherein rolling support surfaces of the upper roller and the lower roller and rolling support surfaces of the upper and lower rails, on which the upper roller and the lower roller are rollably supported, are each a semi-circular contact surface.

8. The door hinge apparatus of claim 1,
   wherein the plurality of rotation elements of the speed reduction unit includes a sun gear, a ring gear, a plurality of planet gears, and a carrier, and
   wherein the speed reduction unit is configured as a single-pinion planetary gear set including, in the casing, the sun gear connected to the rotation shaft, the ring gear, the plurality of planet gears engaged to the sun gear and the ring gear, and the carrier connected to the hinge shaft and configured to rotatably support the plurality of planet gears.

9. The door hinge apparatus of claim 1,
   wherein the plurality of rotation elements of the speed reduction unit includes a sun gear, a ring gear, three planet gears, and a carrier, and
   wherein the speed reduction unit includes:
      the casing fixed to an external surface of the roller block;
      the sun gear disposed at a center portion in the casing and including a rotation center fixedly connected to the rotation shaft;

the three planet gears radially disposed at an equal interval and configured to externally engage with an external periphery of the sun gear;

the ring gear configured as a circular internal gear in the casing and configured to internally engage with the three planet gears; and the carrier including a rotation center fixedly connected to the hinge shaft and configured to rotatably support the three planet gears so that the three planet gears rotate about centers of the three planet gears and revolve around the sun gear.

10. The door hinge apparatus of claim 1, wherein the reduction ratio between the hinge shaft and the rotation shaft connected to the speed reduction unit is set so that a swing operation of the door is completed in proportion to a length of the rail bracket.

11. The door hinge apparatus of claim 1,
wherein the rack is fixed to a lower portion of the rail bracket based on a longitudinal direction, and
wherein the pinion is fixedly connected to the rotation shaft.

12. The door hinge apparatus of claim 1, wherein the upper hinge bar has a 'U' shape, a first end portion of the upper hinge bar is fixed to an upper end portion of the hinge shaft, and a second end portion of the upper hinge bar is fixedly connected to the one end portion of the door.

13. The door hinge apparatus of claim 1, wherein the lower hinge bar has a 'U' shape, a first end portion of the lower hinge bar is rotatably connected to a lower end portion of the rotation shaft, and a second end portion of the lower hinge bar is fixedly connected to the one end portion of the door.

14. The door hinge apparatus of claim 1, wherein a rotation of the hinge shaft and a rotation of the rotation shaft are supported by bearings in the casing.

* * * * *